Feb. 21, 1967  G. M. GROVER ETAL  3,305,005
CAPILLARY INSERT FOR HEAT TUBES AND PROCESS
FOR MANUFACTURING SUCH INSERTS
Filed Dec. 3, 1965  3 Sheets-Sheet 1

INVENTOR.
GEORGE M. GROVER
CLAUS A. BUSSE
BY RENE CARON

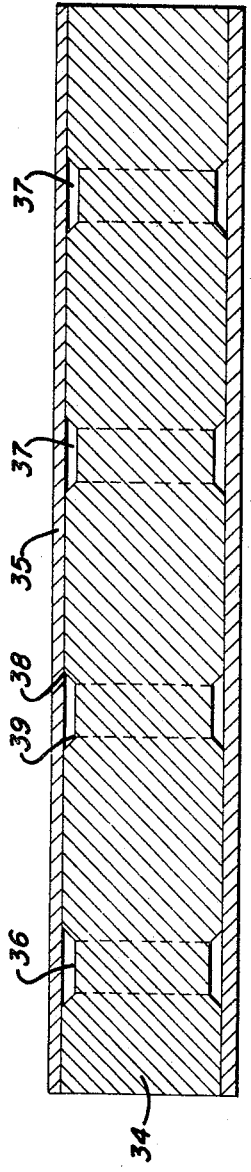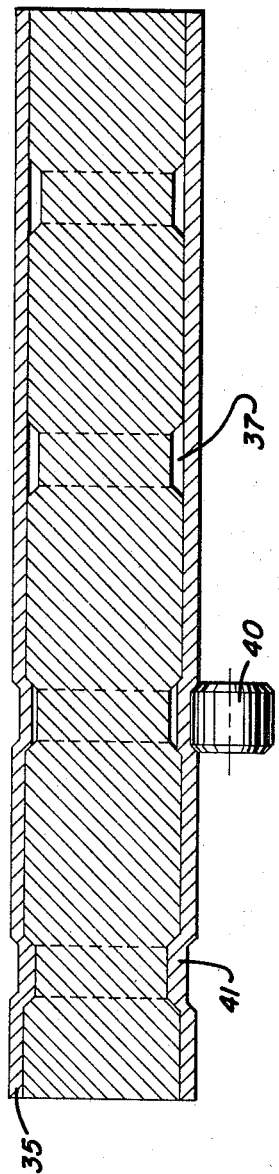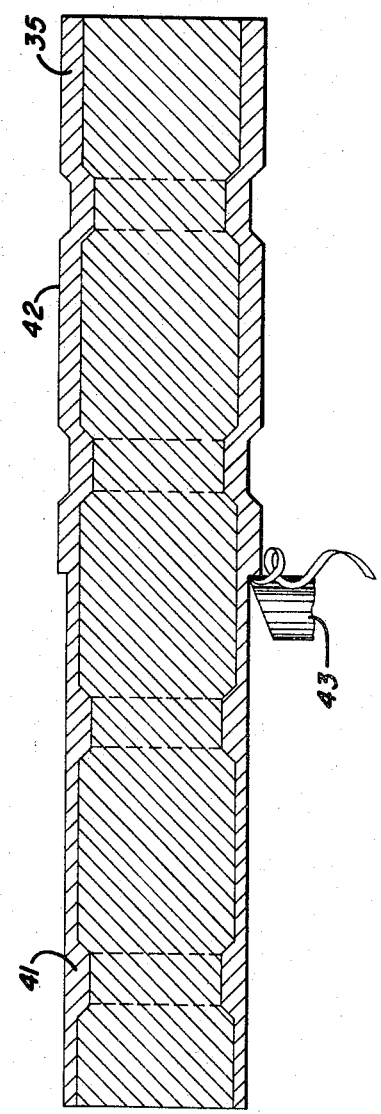

Feb. 21, 1967 G. M. GROVER ETAL 3,305,005
CAPILLARY INSERT FOR HEAT TUBES AND PROCESS
FOR MANUFACTURING SUCH INSERTS
Filed Dec. 3, 1965 3 Sheets-Sheet 3

INVENTOR.
GEORGE M. GROVER
BY  CLAUS A. BUSSE
RENE CARON 3,305,005
CAPILLARY INSERT FOR HEAT TUBES AND PROCESS FOR MANUFACTURING SUCH INSERTS
George M. Grover, Los Alamos, N. Mex., and Claus A. Busse, Laveno, and Rene J. Caron, Ispra, Italy, assignors, by direct and mesne assignments, to the United States of America as represented by the United States Atomic Energy Commission
Filed Dec. 3, 1965, Ser. No. 511,568
5 Claims. (Cl. 165—105)

This invention relates to structures of very high thermal conductance for the transfer of a large amount of heat with a small temperature drop and more particularly, to a capillary structure to be used therewith.

It is a desirable objective in substantially all heat transfer applications to transfer a maximum amount of heat with a minimum temperature drop.

The evaporation of a liquid, transport of the vapor through a duct, and subsequent condensation is a well-known method for the transfer of a large amount of heat with a small temperature drop. In order to work continuously, the condensate must be returned to the evaporator. Ordinarily this is done by gravity or with a pump.

With the invention of the "heat pipe" an entirely new technique of heat transfer has come to life, see Grover, Cotter and Erickson, "Structures of Very High Thermal Conductance," Journal of Applied Physics, vol. 35, 1900 (June 1964). A heat pipe is a transfer device comprising a container, condensable vapor, and capillary means disposed within the container capable of causing the transport of the condensed vapor from a cooler area of the container to a hotter area. The transport of the vapor through the container uses, as a driving force, the difference in vapor pressures in the high temperature zone and the cold temperature zone. The liquid which condenses in the cold zone is returned to the evaporation zone by capillary action. Thus, fluid circulation is established in the pipe with the non-heated end of the pipe acting as a condenser. By means of this circulation, a heat flux is created to flow from the heated end of the pipe to the pipe's non-heated end. The temperature drop along the heat pipe is powers of ten lower than that in the case of conventional heat transports. Furthermore, a uniform temperature distribution is established along the entire pipe surface.

Especially in operation under gravity free conditions, the return of the condensate requires a capillary structure on the internal wall of the heat pipe. Up to now such structures have been formed by porous inserts of ceramic or rolled fine wiremesh.

Inserts of ceramics and rolled wiremesh share the disadvantage that it is difficult to control the dimensions of the capillaries. Moreover wiremesh inserts rapidly become ineffective in operation because they become gradually warped under the influence of the alternating thermal stresses through the heat carrier and become detached from the wall of the heat pipe. Although inserts of ceramics are thermally stable, they are suitable only for low and medium operating temperatures and also only for definite given heat-carrier media.

Accordingly, it is an object of the present invention to provide a capillary structure for a heat pipe that will not become warped under the influence of the alternating thermal stresses.

It is another object to control the dimensions of the capillary structure for a heat pipe.

It is another object to provide for the ease of fabrication of the capillary structure for a heat pipe.

It is another object to provide a capillary structure which is operational in a gravitational field.

It is another object to provide a capillary structure which is operational under gravity free conditions.

According to the invention, a capillary insert for a heat pipe is fabricated from a tube blank which has a metal body open on at least one side and adapted to the geometry of the heat pipe. The insert has capillary grooves in the external surface and other grooves in the internal surface transverse to the former so that an aperture is provided at the point of intersection of the external and internal grooves. The fabricated insert is then disposed with a tight fit into the heat pipe. Subsequently the heat pipe is closed after having been filled with the required quantity of heat carrier. As a material for the insert, niobium tubing is employed for use in nuclear technology. The great advantage of the new capillary structure lies in the controlled machining of the capillaries and in the fact that the stability of the structure can be controlled.

Capillary channels can be provided in the insert in many different ways, for example, as straight channels, as helical lines or as closed annular channels. However in each case, the internal grooves intersect the external grooves. Whereas the capillary grooves are made thinner and smaller, the internal grooves are broadly formed since their only purpose is to establish connection between the capillary channels and the interior of the heat tube so that any condensate formed due to heat loss on the insert is directed by means of the internal and external grooves to the evaporation zone by capillary action. Their number depends indirectly on the desired rigidity of the capillary insert which the latter obtains primarily from the ribs which result between the internal grooves. Consequently, the desired number of ribs directly determines the number of internal grooves.

Decisive in the shaping of the capillary structure in a given case are factors such as whether or not the heat pipe is to operate in a gravitational or non-gravitational field or in both. Other factors which influence the capillary structure are the nature of the condensable vapor and the special position of the heat pipe.

For heat pipes which operate in a gravitational field in a perpendicular or inclined position, which have a diameter exceeding 10 mm., and which contain a heat carrier having a low surface tension, an insert with fine longitudinal capillaries is sufficient merely at the evaporation end of the heat pipe. The part of the internal wall of the heat pipe not constituting the evaporation end may remain smooth because the condensate automatically flows to the bottom. However, if the same heat pipe has a small diameter as for example less than 10 mm., and a heat carrier with a high surface tension as for example lithium, it is then appropriate to provide a coarse longitudinal capillary structure to be inserted in the heat pipe above the evaporation zone. The fine capillaries then carry the heat-carrier condensate from the heat-carrier tank at the bottom of the heat pipe to the evaporation zone against the force of gravity and the coarse capillaries then effect the return of the condensate from the upper part of the heat tube to the evaporation zone. However, if the heat pipe is to operate in a horizontal or approximately horizontal position, then the capillaries must be designed as transverse grooves on the outside and longitudinal grooves must be provided on the inside of the insert.

For heat pipes which are operable under gravity free conditions, capillary inserts having coarse, capillaries extending over the entire length of the heat pipes are sufficient. For operation in a non-gravitational field, capillaries are required only to effect the moistening of the tube with condensate and the transport of the condensate to the evaporation end of the heat pipe. In that the condensate in the non-gravitational situation is not interfered with by gravitational forces, but by the resistance due to friction in the capillaries and the drop of pressure along the vapor flow, the capillaries can be made coarser, i.e., wider as compared to the capillaries utilized in a gravitational field.

For operation of the heat pipe in both a gravitational as well as a non-gravitational field, inserts are required which have coarse capillaries extending over the entire length of the heat pipe and in the evaporation zone, shorter finer capillaries are required which are disposed between the aforementioned coarse capillaries. Therefore, in the evaporation zone, there sequentially follows as viewed about the circumference of the insert, a group of fine capillaries disposed between two coarse capillaries. The aforementioned capillary insert is of interest in spacecraft which are initially tested on the ground in a gravitational field and subsequently operated in a non-gravitational field.

Capillary inserts utilized in heat pipes of large diameter can be produced relatively simply from a corrresponding piece of tube. The capillary grooves are milled on the outside of the tube as, for example, in a longitudinal direction whereas the transverse grooves are turned on a lathe from the inside. Even with long heat pipes, capillary inserts can be fabricated from one or several pieces of tubes. However in the case of small diameter heat pipes the machining of a tube to form an insert becomes difficult, if not impossible, from the inside. A process overcoming this difficulty will be described further below.

The new type of capillary insert as well as a process for the manufacturing of the latter as well as various other objects and advantages will appear from the description of the following embodiments of the invention, and the novel features will be pointed out hereinafter in connection with the claims.

The invention will be clearly understood by references to the accompanying three sheets of drawings wherein:

FIGURE 6 shows a cross-sectional view of a tube having a profiling mandrel inserted therein so as to constitute the first stage of a process for the manufacture of capillary inserts from tubes.

FIGURE 7 shows a cross-sectional view of a tube having a mandrel inserted therein as shown in FIGURE 6, whereby annular transverse flutes are shown being formed.

FIGURE 8 shows a cross-sectional view of a tube having annular flutes as shown in FIGURE 7 whereby the forming of a constant outside diameter is shown.

Figure 1:
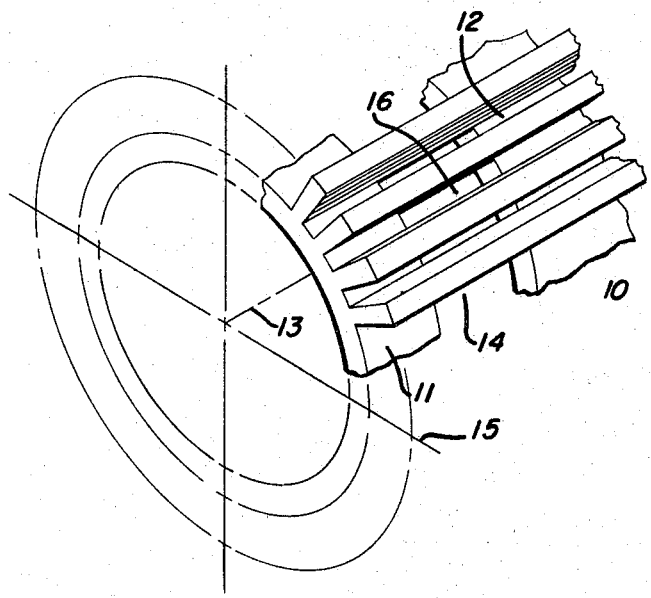
FIGURE 1 is a fragmentary sectional perspective view of a cylindrical capillary insert having fine rectangular longitudinal capillaries on the outside and broad rectangular transverse grooves on the inside of the insert.

In the illustrated embodiment of the invention a capillary insert 10 for a heat pipe is formed from a tube like body 11 wherein fine rectangular capillary channels 12 are milled on the outside of tube 11 in the direction of the longitudinal axis 13 of tube 11. Channel 14 is turned on the inside of tube 11 for example by a lathe, in the direction of the transverse axis 15 of the tube 11 so that channel 14 intersects with capillary channel 12 so as to provide at the point of intersection an aperture 16 through which the two channels communicate with each other. With an outside tube diameter of 10 mm. and inside diameter of 8 mm., the longitudinal capillary channel 12 has a width of about 0.1 mm. and a depth of about 0.5 mm. The transverse channel 14 has a width of about 2 mm. and a depth of about 0.5 mm. About 10 transverse channels as designated by 14 are provided within a 3-cm. length of a tube designated by 11.

Another embodiment of FIGURE 1 would be an insert having transverse channels on an exterior surface and longitudinal channels on an interior surface.

As aforementioned, there are four types of capillary structures that may be used for vertical operation depending on the given operating conditions.

Figure 2:
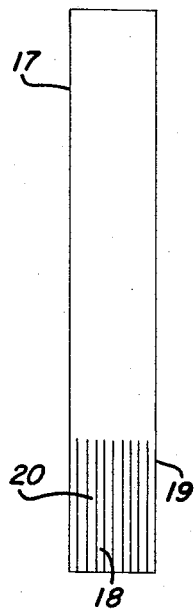
FIGURE 2 shows another embodiment of the invention.

FIGURE 2 shows a sectional view of a heat pipe 17 of normal diameter appearing vertically in a gravitational field. Capillary insert 18 extends only across the evaporation zone 19 of the tube and has exclusively fine capillary channels 20. Beyond the evaporation zone the walls of the heat pipe 17 remains smooth.

Figure 3:
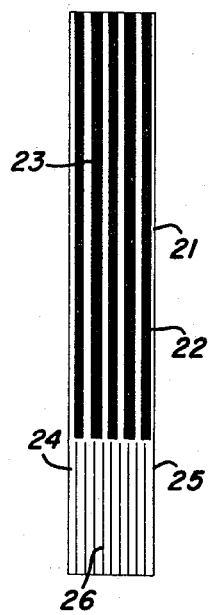
FIGURE 3 shows another embodiment of the invention.

By contrast, in heat pipe 21 as may be seen in the sectional view of FIGURE 3, an additional insert 22 having coarse capillaries 23 is inserted in the heat pipe 21 above insert 24 which is disposed within the evaporation zone 25. Insert 24 is provided with a fine capillary structure 26 similar to that of FIGURE 2.

Figure 4:
FIGURE 4 shows another embodiment of the invention.

FIGURE 4 shows a sectional view of a capillary system for a heat pipe 27 operating in a non-gravitational field. Heat pipe 27 contains an insert 28 having coarse capillaries 29 which extends over the entire length of heat pipe 27.

Figure 5:
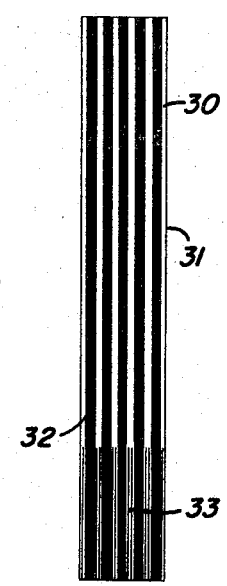
FIGURE 5 shows another embodiment of the invention.

FIGURE 5 shows a sectional view of a capillary insert 30 which is comprised of the structures of FIGURE 2 and FIGURE 4. The structure of FIGURE 5 is suitable for the operation of heat pipe 31 in a non-gravitational field as well as in a gravitational field. The structure of FIGURE 5 may be machined from a single tube blank or from two tube blanks. In FIGURE 5 the width of the coarse capillaries 32 would amount to about 5 times the width of the fine capillaries 33. An example of a suitable structure as seen in FIGURE 5 would be a sequence of a coarse longitudinal capillary followed by ten fine longitudinal capillaries and then another coarse longitudinal capillary, etc.

As aforementioned, the capillary insert as shown in FIGURE 1 has been machined both from the outside and the inside. With the process described below, the longitudinal capillaries and the transverse inner channels whether for the structure of FIGURES 1 through 5 or the converse situation can be machined exclusively from the outside of the tube blank from which the insert is formed. Machining of the insert from the outside which is particularly suitable for fabricating inserts for long and narrow heat pipes is shown in FIGURES 6 through 9. The process of machining inserts from the outside is comprised of the following steps:

(a) The insert tube blank is placed on a cylindrical profiling mandrel which has a sequence of transverse flutes;

(b) The portion of the insert tube adjacent the flutes are forced into the flutes;

(c) The portion of the insert tube which has not been forced into the flutes is machined down so that the outside diameter of the insert tube is a constant;

(d) Through cutting operations, capillaries are provided in the insert having channels in the deformed tube portion and slots in the non-deformed portions of the insert tube;

(e) The profiling mandrel is chemically removed from within the insert tube.

The first stage of the process is shown in FIGURE 6 wherein a profiling mandrel 34 is tightly fitted into the insert tube blank 35. Profiling mandrel 34 has a plurality of transverse flutes 36 so as to define cavities 37 beneath the inside wall of tube 35 and mandrel 34. The insert tube blank 35 selected for the capillary insert may be a niobium tube in which the external diameter is somewhat larger than the internal diameter of the heat pipe in which it is to be inserted. In a heat pipe with an external diameter of 10 mm. and an internal diameter of 9 mm., the tube blank insert should have an external diameter of 10 mm. and an internal diameter of 8 mm. The profiling mandrel 34 which is the same length as the tube blank 35 has an external diameter equal to the internal diameter of tube blank. The profiling mandrel 34 is formed from a material which can be dissolved chemically such as brass. The spacing of flutes 36 depends on the desired rigidity of the capillary insert structure. An example of the spacing of the flutes would be 9 mm. from center to center. The width of the flute at the top as indicated by 38 is 4 mm. and at the bottom as indicated by 39 is 3 mm.

Cavities 37 are filled with the wall of tube blank 35 by the application of forming disc 40 to the respective part of the tube blank adjacent flutes 36 so as to depress the tube wall into the flutes to form the ribs 41 required for the rigidity of the structure as may be seen in FIGURE 7.

In the third stage of fabricating the insert, the tube blank insert 35 has its external diameter 42 machined to the internal diameter of the heat pipe in which it is to be inserted by means of the lathe tool 43 as shown in FIGURE 8. Thus, the tube blank after the third stage of fabrication again has a constant outside diameter.

Figure 9:
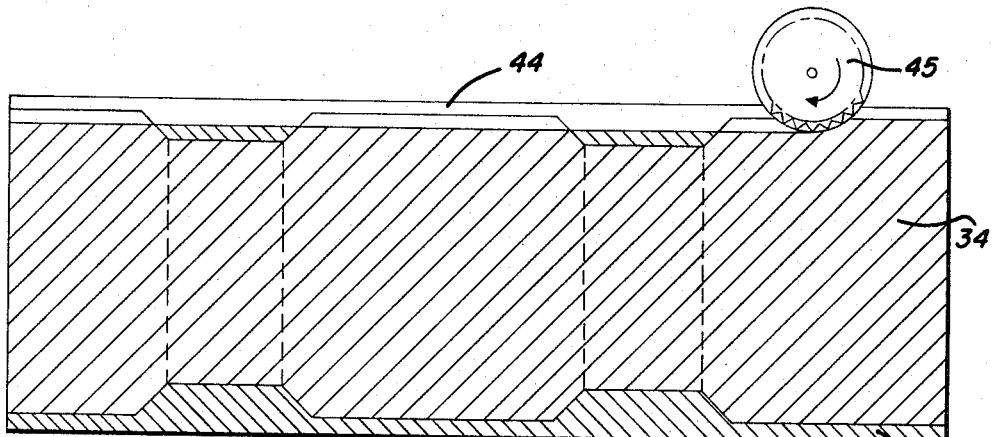
FIGURE 9 shows a cross-sectional view of a tube blank of FIGURE 8 having a profiling mandrel during the machining of the channels therein.
Figure 10:
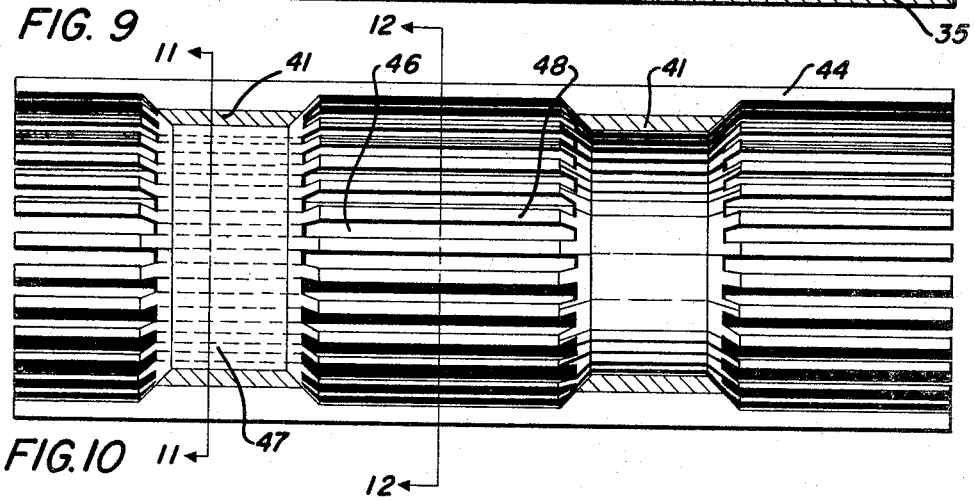
FIGURE 10 shows a longitudinal cross-sectional view of the completed capillary insert after the profiling mandrel has been removed.
Figure 11:
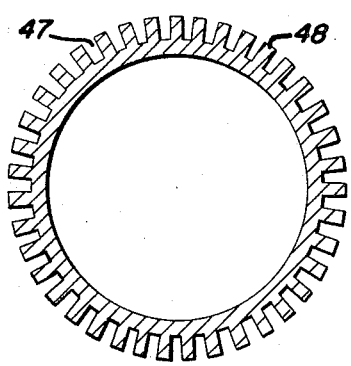
FIGURE 11 is a transverse sectional view taken along line 11—11 of FIGURE 10.
Figure 12:
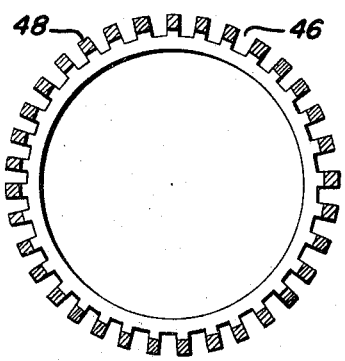
FIGURE 12 is a transverse sectional view taken along line 12—12 of FIGURE 10.

As seen in FIGURE 9, the longitudinal capillary channels 44 are milled into tube blank 35 by means of milling cutter 45 which is successively fed along parallel generatrices of the tube blank. The milling cutter 45 cuts into the profiling mandrel 34 as is clearly shown in FIGURE 9.

The capillary structure and the profiling mandrel are finally separated chemically by dissolving the mandrel in nitric acid to complete the insert so that capillaries 44 are provided which comprise in the section of tube blank 35 without ribs 41, open slots 46, and in the section of tube blank 35 having ribs 41, channels 47. Ribs 41 are seamlessly connected by longitudinal fillets 48 separating capillaries 44.

In the case of producing a structure which is the converse of FIGURE 1, that is a structure with external transverse annular grooves as capillaries formed on the outside of the insert structure and with internal longitudinal grooves, the profiling mandrel would have to be provided with longitudinal flutes. The insert would then be fabricated in a manner as set forth above.

In operation a heat pipe having a capillary insert with 60 capillaries each 0.1 mm. wide and 0.5 mm. deep, fabricated from a niobium tube with a diameter of 9 mm. and a length of 150 mm. was successively exposed ten times to alternating thermal stresses between 150° C. and 1,570° C. over a period of 15 hours in a niobium heat tube with silver as the heat carrier. The structure was also successively exposed 20 times to alternating thermal stresses between 500° C. and 1,570° C. without impairment of operating quality.

It will be understood that various changes in the details, steps and arrangement of parts which have herein been described and illustrated in order to explain the nature of the invention may be made by those skilled in the art within the principle and scope of the invention as expressed in the appended claims.

What is claimed is:
1. In a heat transfer device which includes a container, a condensable vapor disposed within said container, the improvement which comprises a capillary insert disposed within said container having a longitudinal capillary groove in the external surface and a transverse groove in the inner surface of said insert so as to define an aperture at the point of intersection of said longitudinal groove and said transverse groove.

2. In a heat transfer device which includes a container, a condensable vapor disposed within said container, the improvement which comprises a capillary insert disposed within said container having at least two longitudinal capillary grooves in the external surface and at least two transverse grooves in the inner surface of said insert so as to define apertures at the points of intersection of said longitudinal grooves and said transverse grooves.

3. In a heat extraction system according to claim 1 wherein said improvement comprises a capillary insert adapted to the geometry and disposed within said container, said insert having a coarse longitudinal capillary groove and a fine longitudinal capillary groove in the external surface and a transverse groove in the inner surface of said insert so as to define an aperture at the points of intersection of said coarse and fine longitudinal grooves and said transverse groove.

4. In a heat transfer device which includes a tubular container, a condensable vapor disposed within said container, the improvement comprising a tubular capillary insert adapted to the geometry and disposed within said container, said insert having a coarse longitudinal capillary groove and a plurality of fine longitudinal capillary grooves in the external surface of said insert, said coarse groove and plurality of fine grooves alternate in the transverse circumferential direction of said insert, and a plurality of transverse grooves in the inner surface of said insert so as to define an aperture at the points of intersection of said longitudinal coarse and fine grooves and said transverse grooves.

5. A heat transfer system according to claim 4 wherein said improvement comprises a tubular capillary insert adapted to the geometry and disposed within said container, said insert having coarse longitudinal capillaries in the external surface of said insert in echelonned relationship with a plurality of fine longitudinal capillary grooves in the external surface of said insert and a plurality of transverse grooves in the inner surface of said insert so as to define an aperture at the points of intersection of said coarse longitudinal capillaries, fine longitudinal grooves and transverse grooves.

References Cited by the Examiner

UNITED STATES PATENTS

| 2,134,146 | 10/1938 | Raisch | 29—163.5 |
| 2,153,942 | 4/1939 | Spalding | 165—105 X |
| 2,350,347 | 6/1944 | Gaugler | 165—133 X |
| 2,691,281 | 10/1954 | Phillips | 62—491 |
| 3,025,685 | 3/1962 | Whitlow | 165—133 X |
| 3,152,774 | 10/1964 | Wyatt | 244—1 |
| 3,229,759 | 1/1966 | Grover | 165—105 |
| 3,247,579 | 4/1966 | Cattermole et al. | 29—163.5 X |

ROBERT A. O'LEARY, *Primary Examiner.*

A. W. DAVIS, *Assistant Examiner.*